Aug. 16, 1949.   J. H. TILLOTSON   2,479,432
TIRE REMOVING MACHINE, AXIALLY SHIFTING TYPE
Filed June 20, 1946                           3 Sheets-Sheet 1
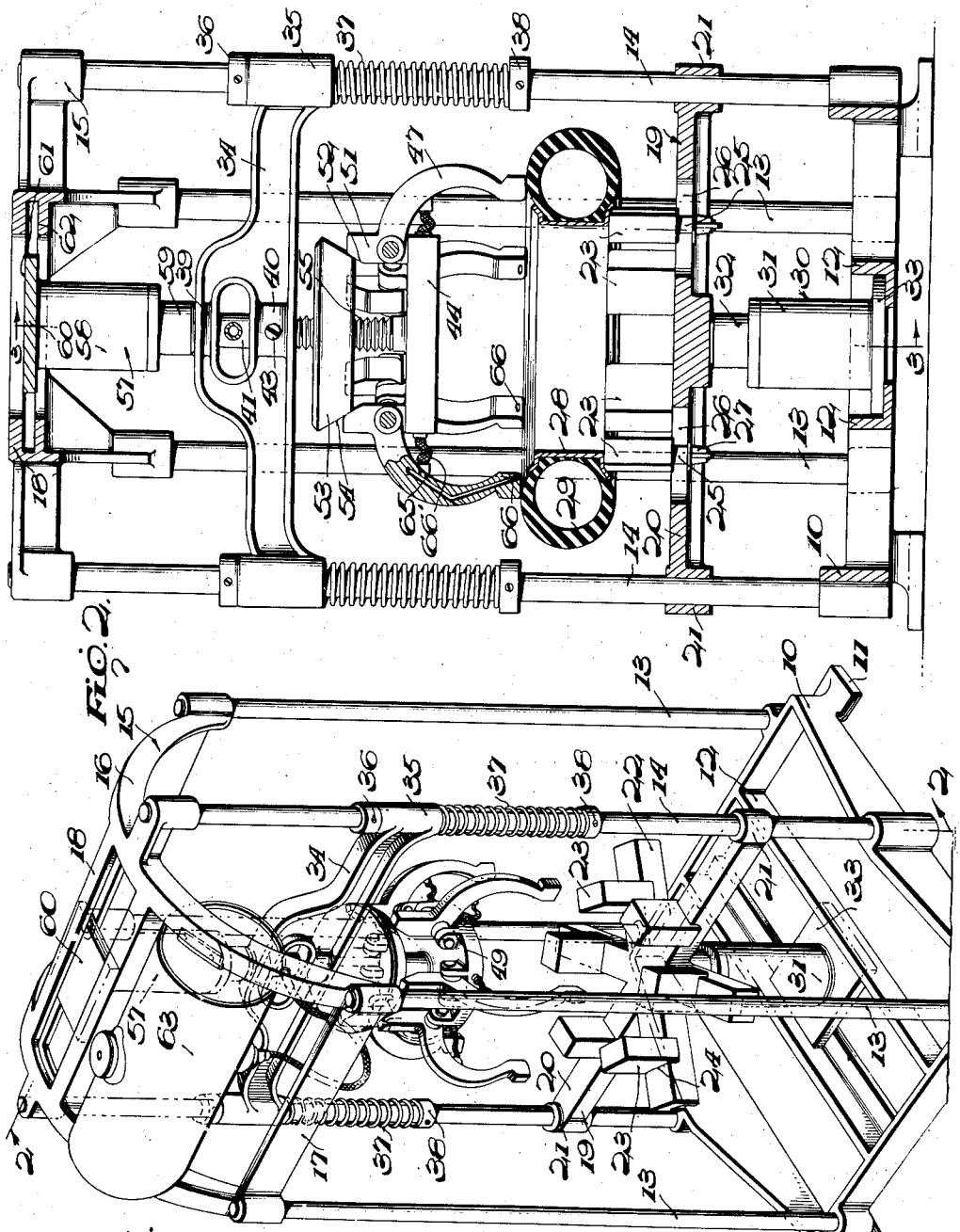
INVENTOR.
J. H. Tillotson.
BY

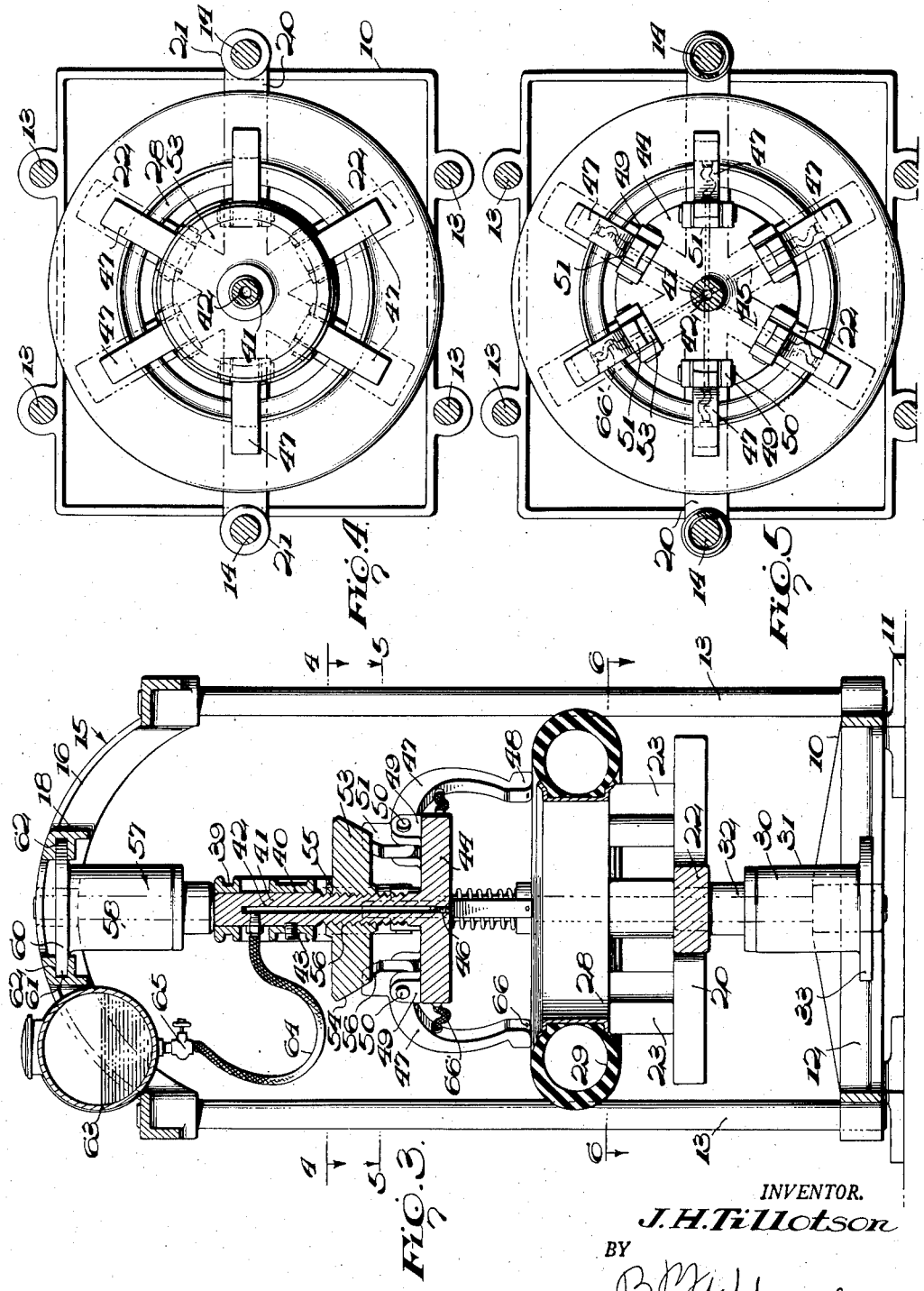

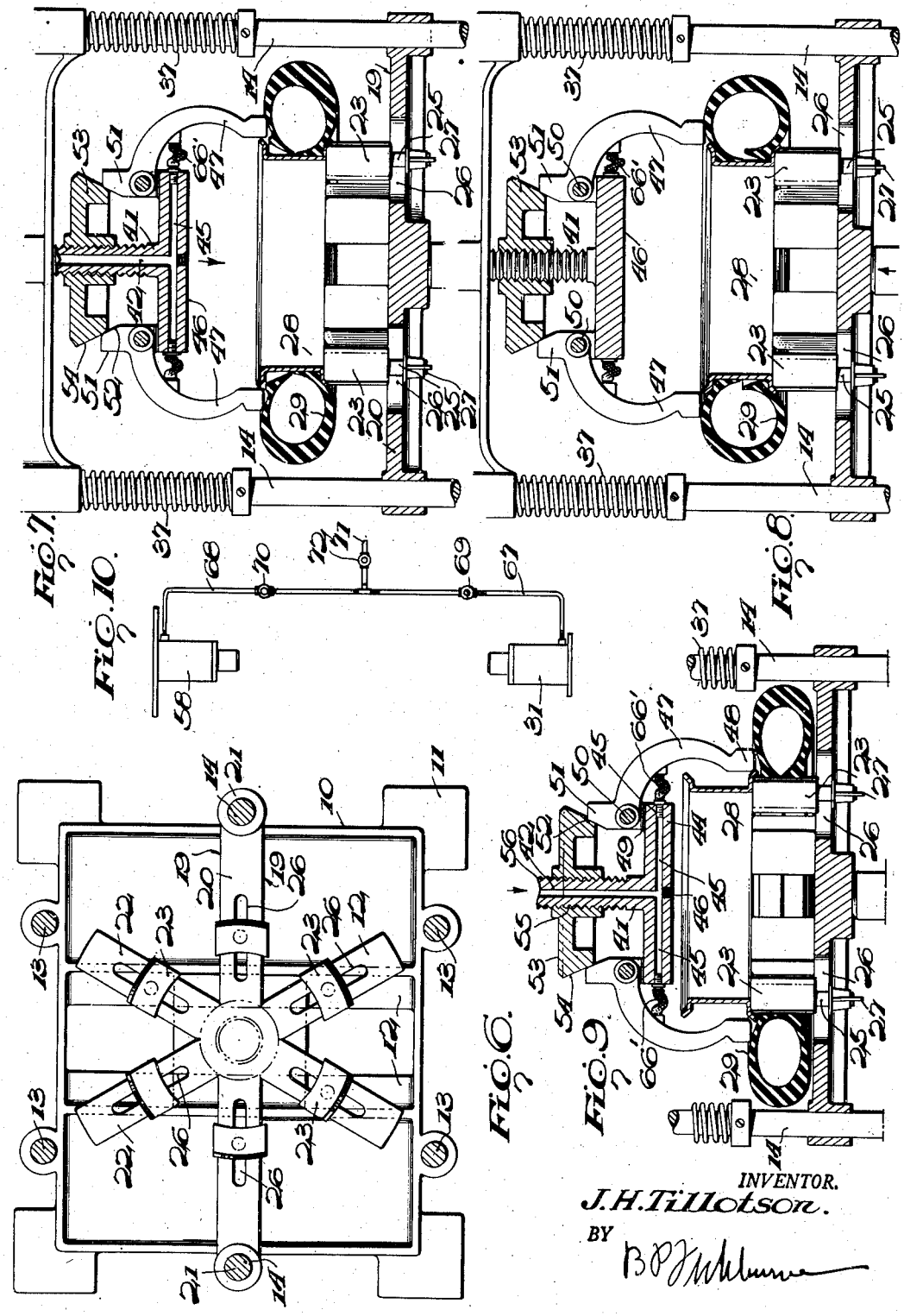

Patented Aug. 16, 1949

2,479,432

UNITED STATES PATENT OFFICE 2,479,432

TIRE REMOVING MACHINE, AXIALLY SHIFTING TYPE

James H. Tillotson, Spartanburg, S. C.

Application June 20, 1946, Serial No. 678,033

4 Claims. (Cl. 157—1.2)

My invention relates to a machine for removing tires or casings from rims.

An important object of the invention is to provide a machine of the above mentioned character, which will quickly remove heavy tires or casings from the rim, even when they are frozen thereon.

A further object of the invention is to provide means for moving the tire or casing with respect to the rim, or the rim with respect to the casing, or both.

A further object of the invention is to provide a machine of the above mentioned character which is adjustable, for operating upon tires or casings of different sizes.

A further object of the invention is to provide means for supplying a lubricant between the tire or casing and the rim, to break the freeze between the tire or casing, and the rim and to expedite the removal of the casing.

A further object of the invention is to provide a machine of the above mentioned character which may be operated by a single attendant.

Other objects and advantages of the invention will be apparent during the course of the following description.

In the accompanying drawings forming a part of this application and in which like numerals are employed to designate like parts throughout the same.

Figure 1 is a perspective view of a machine embodying my invention,

Figure 2 is a vertical section, taken on line 2—2 of Figure 1, parts in elevation, Figure 3 is a vertical section taken on line 3—3 of Figure 2, Figure 4 is a horizontal section taken on line 4—4 of Figure 3, Figure 5 is a similar view taken on line 5—5 of Figure 3, Figure 6 is a similar view taken on line 6—6 of Figure 3, Figure 7 is a central vertical section through the upper tire removing unit, showing the same lowered, Figure 8 is a similar view showing the rim supporting, removing, or engaging unit partly raised, Figure 9 is a similar view showing the tire or casing removed, and Figure 10 is a side elevation of the press cylinders and associated elements.

In the drawings wherein for the purpose of illustration is shown a preferred embodiment of my invention, the numeral 10 designates a horizontal base, having feet 11 and horizontal angle-irons 12. This base is preferably an integral casting.

Rigidly secured to the base 10 are vertical posts or rods 13 and 14, preferably equi-distantly spaced. A top 15 is rigidly mounted upon the posts 13 and 14. This top preferably includes arched ends 16 and horizontal sides 17, and horizontal top rails 18. The top is preferably an integral casting.

The numeral 19 designates a rim supporting, engaging, or removing unit or device, including a horizontal bar 20, having sleeves 21, slideable upon the posts 14. Formed integral with the bar 20 are radial horizontal bars 22. The bars 20 and 22 have blocks 23 arranged above and mounted upon the same, and these blocks have grooves 24 to partly receive the bars. The blocks 23 are radially adjustable upon the bars and at their lower ends carry shanks 25, operating within elongated slots 26, formed in the bars 20 and 22. The shanks 25 carry winged nuts 27, screw-threaded thereon. The blocks may be locked to the bars in the selected adjusted position by manipulating the nuts 27. The blocks support the rim 28, carrying the tire or casing 29, and the blocks are radially adjustable, to accommodate rims of different diameters.

The numeral 30 designates a hydraulic press, including a vertical cylinder 31 and plunger 32. The cylinder 31 has a base 33, removably mounted upon the angle-irons 12. The plunger 32 engages the rim supporting, engaging or removing device 19 at its center, as shown.

The numeral 34 designates a cross-head, having sleeves 35, slideably mounted upon the posts 14. The upward movement of the sleeves 35 is limited by stop-rings 36 clamped to the posts 14. The sleeves 35 are moved upwardly by compressible coil springs 37, carried by the posts 14, and engaging stop-rings 38, clamped to the posts 14.

The cross-head 34 is provided with intermediate sleeves 39 and 40, receiving a vertical tubular shaft 41, having a port 42, the upper end of which is closed. This shaft is clamped within the sleeve 40 by a set screw 43. The shaft 40 has a cylindrical head or disk 44, rigidly secured thereto by any suitable means, and preferably formed integral therewith. This head or disk 44 has radial ports 45, Figure 9, drilled therein and in communication with the port 42. The port 42 may be drilled from the head or disk 44 and the lower end of the port 42 is closed by a plug 46, as shown. Tire or casing engaging arms 47 are provided, having preferably blunt ends 48, to engage the tire or casing outwardly of and adjacent to the rim 28. These tire engaging arms are preferably longitudinally curved, and their upper ends are arranged between apertured knuckles 49, arranged above and preferably formed integral with the head or disk 44. Pins 50 pivotedly connect the arms 47 with the apertured knuckles.

The arms 47 are provided at the upper ends with extensions or cranks 51, having beveled faces 52, for engagement with an adjusting disk 53, having a beveled face or periphery 54. This disk has a sleeve or hub 55, internally threaded, to engage external threads 56, formed upon the shaft 41. By turning the disk 53 the arms 47 may be swung upon their pivots, so that their lower ends 48 may be moved radially inwardly or their outward movement limited.

The numeral 57 designates an upper press, including a cylinder 58 and plunger 59, arranged to engage the top of the cross-head 34. The cylinder 58 has a base 60, provided with flanges 61, held within grooves 62, formed in the rails 18.

Suitably mounted upon the top 16 is a tank 63, for holding a liquid lubricant. This tank is provided with a flexible outlet hose 64, equipped with a valve 65. This hose is connected with the shaft 41, Figure 3, and is in communication with the port 42. The arms 47 have ports 65, formed or drilled therein, Figure 2. These ports extend longitudinally of the arms and their outlet ends 66 are adjacent to the ends 48 and arranged at their inner faces. Flexible hose 66', having suitable slack, are connected with the arms 47 and their outer ends communicate with the ports 65, while their inner ends are connected with the head 44 and communicate with the radial ports 45.

The cylinder 31 is connected with a hose 67 and the cylinder 58 is connected with a hose 68. The hose 67 has a cut off valve 69 and the hose 68 a cut off valve 70. The two hose 67 and 68 are connected with a common hose 71, leading to a source of pressure, which may be pneumatic or hydraulic. The hose 71 has a valve 72 which may be adjusted to permit of the passage of pressure to the hose 67 and 68, or to cut off this passage of pressure and place the hose 67 and 68 in communication with the atmosphere.

The operation of this machine is as follows: The springs 37 serve to raise the cross-head 34 to the uppermost position whereby the arms 47 are elevated. The supporting device 19 will assume the lowermost position, when the pressure is exhausted from the cylinder 31. The arms 47 have their lower ends swung manually outwardly, depending upon the size of the tire or casing 29 to be removed. The pivots of these arms may be sufficiently stiff so that the arms will remain in the adjusted position prior to the application of pressure thereto. The tire or casing 29 and rim 28 is now introduced into the frame of the machine and the rim 28 supported upon the blocks 23, which are radially adjustable. Figure 2 shows the supporting device 19 and head 44 moved slightly inwardly so that the arms 47 will engage with the tire or casing 29. By rotating the disk 53, the lower ends of the arms 47 may be adjusted inwardly and positively held against outward movement. With the tire positioned in the machine, as shown in Figure 2, the valve 72 is adjusted to supply the pressure to the hose 67 and 68 and the valves 69 and 70 may be adjusted to permit the passage of the pressure through these hose into the outer ends of the cylinders 31 and 58. If desired, the tire or casing 29 may be removed from the rim by retaining the supporting device 19 stationary, and moving the head 44 downwardly. The starting of this operation is shown in Figure 7. The head 44 may be held stationary and the supporting device 19 raised, and the tire will be removed from the rim 28. The starting of this operation is shown in Figure 8. The head 44 may be moved downwardly and the supporting device 19 moved upwardly simultaneously, and this will remove the tire from the rim. The completion of the three operations is shown in Figure 9. To separate out the tire and rim from the machine, after separation of the tire and rim, the pressure is exhausted from the cylinders 31 and 58, at which time the head 44 rises and the supporting device 19 descends by gravity. As is well known, particularly with heavy or large tires, there is a tendency for the tire or casing to freeze to the rim. To overcome this, during the separating operation, the valve 65 is opened, and the liquid lubricant is supplied through the ports 65 and discharges upon the top of the tire adjacent to its inner edge or rim 28. This lubricant will flow downwardly and pass between the edges or beads of the tire and rim, lubricating the contacting parts and serving to break the freeze and expedite the separation of the tire or casing from the rim. While it is preferred to use the lower and upper presses 30 and 58, yet I contemplate omitting the lower press 30, in which event the supporting device 19 will rest upon the base 10.

It is to be understood that the form of my invention herewith shown and described, is to be taken as a preferred example of the same and that the various changes in the shape, size, and arrangement of parts may be resorted to without the departing from the spirit of my invention or the scope of the subjoined claims.

Having thus described my invention, what I claim is:

1. A machine for removing a tire or casing from its rim, comprising a support, a tubular shaft having a port, guide means secured to the tubular shaft to mount the tubular shaft upon the support, tire engaging arms, a head carried by the tubular shaft and having the arms pivoted thereon and provided with ports in communication with the port of the tubular shaft, the arms having ports provided with outlet ends disposed near the ends of the arms which engage the tire, flexible tubes connecting the ports of the arms and the ports of the head, a tank mounted upon the support for holding a liquid lubricant, a flexible tube connecting the tank and the port of the tubular shaft, an adjusting element mounted upon the tubular shaft and engaging the arms, a rim engaging device mounted upon the support and arranged axially opposite to the arms, and means to effect a relative axial movement between the guide means and the rim engaging device.

2. A machine for removing a tire or casing from its rim, comprising a substantially vertical frame, including a base, substantially vertical guide rods mounted upon the base, and spaced from each other so that the tire and rim may be arranged horizontally between them, a cross head slidably mounted upon the guide rods, a top secured to the upper ends of the guide rods and arranged above and spaced from the cross head, a press arranged between the top and cross head and mounted upon the top and serving to move the cross head, a lower substantially horizontal bar slidably mounted upon the guide rods and spaced from the base, a press arranged between the lower bar and base and mounted upon the base and serving to move the lower bar upwardly, rim engaging means mounted upon the lower bar, a shaft mounted upon the cross head and extending substantially vertically below the same and screw threaded, a second head secured to the lower portion of the shaft, vertically swinging tire engaging arms pivotally mounted upon the second head and having upstanding extensions arranged above the second head, and a disc arranged above the second head and near the cross head and having screw threaded engagement with the shaft and having a tapered periphery engaging the extensions of the arms.

3. A machine for removing a tire or casing from its rim, comprising a frame including substantially vertical guide rods which are spaced to receive the horizontally arranged rim and tire between them, a cross head slidably mounted upon the guide rods, a second head mounted upon said cross head to move therewith, means to move the cross head downwardly, substantially swinging tire engaging arms pivotally mounted upon the second head and which are generally upstanding and have lower ends to contact with the side of the tire, said arms having longitudinal ports which extend through the lower ends of the arms adjacent to the inner faces of the arms so that the ports remain uncovered at the beginning of the operation and are arranged adjacent to the rim, adjustable means to swing the arms in one direction, and a rim supporting device mounted upon the frame and arranged beneath the arms, and means to supply a lubricant to the ports.

4. A machine for removing a tire or casing from its rim, comprising a substantially vertical frame including a base, substantially vertical guide rods mounted upon the base and spaced from each other so that the tire and rim may be arranged horizontally between them, a cross head slidably mounted upon the guide rods, a top secured to the guide rods and arranged above and spaced from the cross head, a press arranged between the top and cross head and serving to move the cross head downwardly, springs mounted upon the guide rods beneath the cross head and serving to move the cross head upwardly, rim engaging means mounted near the base, a substantially vertical shaft mounted upon the cross head and depending below the same and held against turning movement and having its lower portion screw threaded, a second head secured to the lower portion of the substantially vertical shaft, vertically swinging tire engaging arms pivotally mounted upon the second head and extending above and below the same, and a disc arranged between the cross head and second head and having screw threaded engagement with the screw threaded portion of the shaft and having a tapered periphery to engage the upper ends of the pivoted arms, the lower ends of such pivoted arms being adapted to engage the side or the tire or casing.

JAMES H. TILLOTSON.

REFERENCES CITED

The following references are of record in the file of this patent:

UNITED STATES PATENTS

| Number | Name | Date |
|---|---|---|
| 601,088 | Verel | Mar. 22, 1898 |
| 1,376,340 | Klay | Apr. 26, 1921 |
| 1,492,729 | Johnson | May 6, 1924 |
| 1,564,092 | Miller | Dec. 1, 1925 |
| 1,564,496 | Staugaard | Dec. 8, 1925 |
| 1,724,813 | Weaver et al. | Aug. 13, 1929 |
| 1,890,746 | O'Dell | Dec. 13, 1932 |
| 2,228,086 | Rodgers | Jan. 7, 1941 |
| 2,253,713 | Lancaster | Aug. 26, 1941 |
| 2,267,662 | Miller | Dec. 23, 1941 |
| 2,375,956 | Smith et al. | May 15, 1945 |
| 2,406,996 | Colley | Sept. 3, 1946 |
| 2,416,195 | Mitchell | Feb. 18, 1947 |

FOREIGN PATENTS

| Number | Country | Date |
|---|---|---|
| 248,107 | Great Britain | Mar. 4, 1926 |